(12) United States Patent
Broum

(10) Patent No.: US 9,832,748 B1
(45) Date of Patent: Nov. 28, 2017

(54) SYNCHRONIZING BEACON DATA AMONG USER DEVICES

(71) Applicant: Google Inc., Mountain View, CA (US)

(72) Inventor: Milan Broum, Carshalton (GB)

(73) Assignee: Google Inc., Mountain View, CA (US)

( * ) Notice: Subject to any disclaimer, the term of this patent is extended or adjusted under 35 U.S.C. 154(b) by 172 days.

(21) Appl. No.: 14/754,968

(22) Filed: Jun. 30, 2015

(51) Int. Cl.
  *H04W 56/00* (2009.01)
  *H04W 4/00* (2009.01)
  *H04W 4/02* (2009.01)
  *H04W 40/24* (2009.01)

(52) U.S. Cl.
  CPC ......... *H04W 56/002* (2013.01); *H04W 4/008* (2013.01); *H04W 4/02* (2013.01); *H04W 40/244* (2013.01)

(58) Field of Classification Search
  CPC ..... H04W 56/002; H04W 4/008; H04W 4/02; H04W 40/244
  See application file for complete search history.

(56) References Cited

U.S. PATENT DOCUMENTS

| | | |
|---|---|---|
| 8,509,105 B2 | 8/2013 | Kneckt et al. |
| 2012/0096121 A1 | 4/2012 | Hao et al. |
| 2013/0170429 A1* | 7/2013 | Yamamoto ........ H04W 52/0203 370/315 |
| 2014/0241315 A1 | 8/2014 | Niu et al. |
| 2014/0307705 A1 | 10/2014 | Kalhan |

* cited by examiner

*Primary Examiner* — Ronald B Abelson
(74) *Attorney, Agent, or Firm* — Dority & Manning, PA

(57) ABSTRACT

Systems and methods of synchronizing beacon data are provided. In particular, a control device can broadcast beacon data indicative of an action to be performed by one or more proximate user devices. A user device can detect the beacon data and perform the action in accordance with the beacon data. The user device can then rebroadcast the beacon data, such that the beacon data can be detected by a second user device. The second user device can then perform the same action in accordance with the beacon data.

19 Claims, 7 Drawing Sheets

SYNCHRONIZING BEACON DATA AMONG USER DEVICES

FIELD

The present disclosure relates generally to beacon devices and more particularly to synchronizing beacon data among proximate user devices.

BACKGROUND

In recent years, location based functionality associated with mobile computing devices has become increasingly popular. Location based functionality can allow a user device, such as a smart phone, tablet wearable computing device, etc. to receive information and to perform actions associated with the information. Such location based functionality can be implemented, for instance, through the use of beacon devices. Beacon devices are a recent technology that can be used, for instance, in determining proximity and location. A beacon device is a small, low cost, self-contained device that can periodically provide (e.g. broadcast using a short range wireless communication technology) information. A user device can receive the information and use the knowledge of the identity of the beacon device and proximity to the beacon device for various purposes, including determining location, communication, asset tracking, retail identification, safety, etc.

In conventional implementations, a user device must be within a certain range (e.g. broadcast range) of the beacon device to detect the information broadcast by the beacon device. This can limit the mobility of users who desire to receive information from the beacon device. For instance, beacon data being broadcast by a beacon device located in a large room with a crowd of people may not reach a user in a far corner of the room.

SUMMARY

Aspects and advantages of embodiments of the present disclosure will be set forth in part in the following description, or may be learned from the description, or may be learned through practice of the embodiments.

One example aspect of the present disclosure is directed to a computer implemented method of synchronizing data in a beacon network. The method comprises scanning, by one or more computing devices, for beacon data, the beacon data being broadcast by one or more mobile computing devices using short range wireless communication technology. The method further comprises detecting, by the one or more computing devices, beacon data from at least one of the mobile computing devices. The beacon data is indicative of a first action performed by a control device. The method further comprises performing, by the one or more computing devices, the first action. The method further comprises responsive to detecting the beacon data, broadcasting, by the one or more computing devices, the beacon data using short range wireless communication technology.

Other aspects of the present disclosure are directed to systems, apparatus, tangible, non-transitory computer-readable media, user interfaces and devices for scanning for beacon devices.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
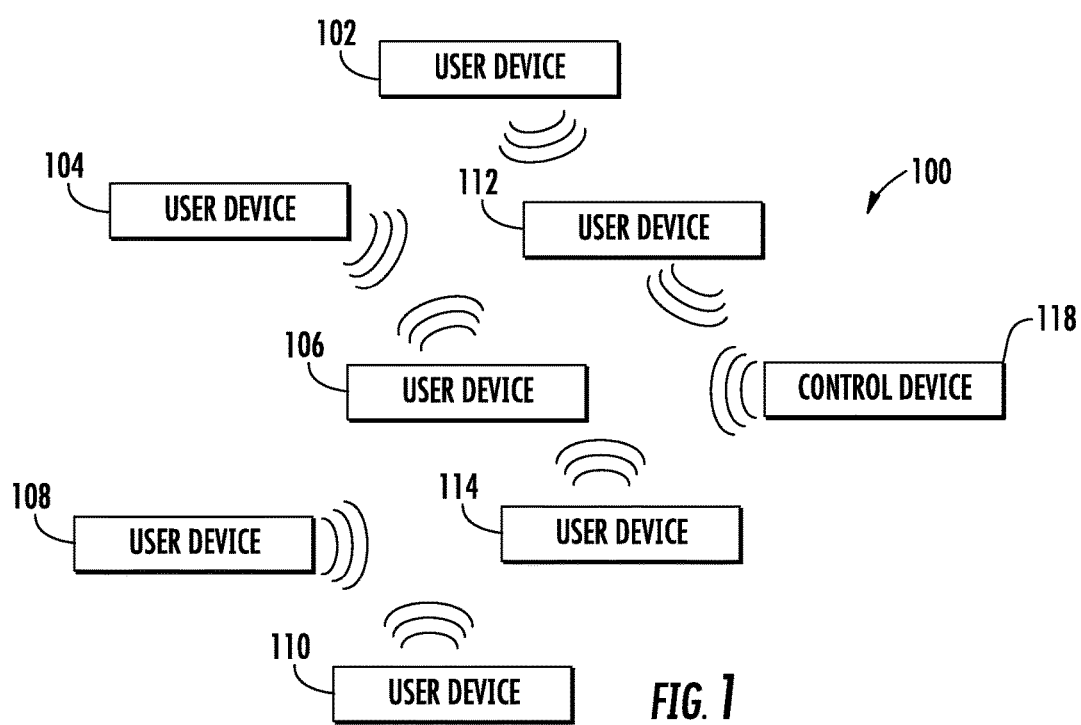
FIG. 1 depicts an example system for synchronizing displayed information on user devices according to example embodiments of the present disclosure.

Reference will now be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Example aspects of the present disclosure are generally directed to synchronizing actions performed by mobile computing devices. In particular, a plurality of mobile computing devices can be configured to scan for beacon data. Each mobile computing device can be further configured to broadcast (e.g. using short range wireless communication technology) beacon data. In example embodiments, the beacon data can include a signal indicative of an action to be performed by a mobile computing device. Such action can include, for instance, panning, scrolling, and/or zooming within a user interface associated with the mobile computing device. The action can further include playing audio or video files, providing a notification for display, opening an application, navigating through an application and/or various other suitable actions.

According to example embodiments, a control device can perform an action. The control device can be, for instance, a beacon device. A beacon device can be, for instance, a radio frequency (RF) beacon device (e.g. a Bluetooth™ Low Energy (BLE) beacon device), an infrared beacon device, or a radio frequency identification (RFID) tag. In alternative embodiments, the control device can be a mobile computing device, such as a user device, that is configured to broadcast beacon data. For instance, the user device can include a beacon device as described above. A user device can be a smartphone, tablet, wearable computing device, laptop, or any other suitable computing device capable of being carried by a user while in operation.

The action performed by the control device can be performed responsive to a user input. For instance, a user of the control device can interact with a user interface of the control device and the control device can perform an action responsive to the interaction. The control device can then broadcast beacon data indicative of the action performed. For instance, if the control device zooms in on an image within an application, the beacon data can include a signal indicative of the zooming action. In particular, the beacon data can include a signal indicative of characteristics of the action (e.g. depth of zoom, position of zoom, etc.), such that the same zooming action can be performed by another user device on which the image is displayed.

As indicated above, one or more user devices can be configured to scan for beacon data. While scanning, a user device can detect the beacon data and perform an action associated with the beacon data. In example embodiments, the action can be the same action performed on the control device. For instance, continuing the previous example, if a user device detects the beacon data indicative of the zooming action performed by the control device, the user device can then perform the same zooming action on the same image as displayed by the user device in accordance with the beacon data. In this manner, the user device can mimic the actions performed by the control device such that a user of the user device sees the same displayed information as the user of the control device.

Responsive to detecting the beacon data from the control device, the user device can be configured to rebroadcast the detected beacon data (e.g. using short range wireless communication technology). A different user device can then detect the beacon data being broadcast by the first user device (or the control device). The different user device can then similarly perform the action associated with the beacon data (e.g. the zooming action) based on the beacon data. The different user device can then rebroadcast the beacon data such that the beacon data may be detected by yet another user device.

In this manner, a user device is not required to detect beacon data directly from the control device. The beacon data can originate at the control device and can be transmitted to a plurality of user devices via a mesh topology. As each user device receives the beacon data and performs the action associated with the beacon data, information displayed by each user device can be synchronized with the information displayed by the control device, such that each device displays the same information.

In example embodiments, the control device can subsequently perform a second action, for instance, responsive to a second user input. The control device can then broadcast updated beacon data. The updated beacon data can include a signal indicative of the second action. A user device that receives the updated beacon data can compare the updated beacon data against the previous beacon data. If the updated beacon data is different than the previous beacon data, the user device can perform the second action associated with the updated beacon data. The user device can then cease broadcasting the previous beacon data and begin broadcasting the updated beacon data. One or more other user devices may then detect the updated beacon data being broadcast by the user device. The other user devices may then compare against any previous beacon data, perform the second action, and rebroadcast the updated beacon data.

In a particular implementation, a user device can subscribe to a device from which beacon data was received. For instance, if a first user device detects beacon data from the control device or from a second user device, the first beacon device can subscribe to the control device or the second user device. Once the first user device subscribes to another device, the first user device can cease scanning for beacon data. In alternative embodiments, the first user device can decrease a scan rate of scanning for beacon data. When the subscribed-to device then detects updated beacon data, the subscribed-to device can provide the updated beacon data to the user device directly, such that the user device is not required to continuously scan for beacon data. In alternative embodiments, the subscribing user device can listen for updates in the beacon data being broadcast by a subscribed-to device. When the subscribing device detects an update, the subscribing device can provide a request to the subscribed-to device for the updated beacon data.

In some embodiments, in order to obtain the benefits of the techniques described herein, the user may be required to allow the collection and analysis of location information associated with the user or the user device. Therefore, in some embodiments, users may be provided with an opportunity to control settings associated with whether programs or features collect such information. If the user does not allow collection and use of such signals, then the user may not receive the benefits of the techniques described herein. For instance, changes to these settings can cause scanning for one or more beacon devices to be enabled or disabled. The user can also be provided with tools to revoke or modify consent. In addition, in some embodiments, certain information or data can be treated in one or more ways before it is stored or used, so that personally identifiable information is removed.

FIG. 1 depicts an example system 100 according to example embodiments of the present disclosure. System 100 can include a plurality of user devices 102-114, and at least one control device 118. User devices 102-114 can be used for many different applications, including, for example, co-presence (e.g. two entities becoming aware of each other), location-based gaming, asset tracking, beacon device localization or observing entity localization, telemetry, information provisioning (e.g. use of an observing entity to obtain various information such as semantic information or geographic information associated with beacon devices 102-110 as the observing entity moves about the world), intra-beacon communication, payment systems, etc. Other applications can include providing information associated with a business, such as a menu for a restaurant, providing information associated with a museum exhibit, providing information associated with a transit schedule, etc. The present disclosure provides a general system that can be applicable to the above noted applications or other suitable applications as well.

User devices 102-114 can be mobile computing devices (e.g. smartphones, tablets, wearable computing devices, or any other suitable mobile computing device capable of being carried by a user while in operation) configured to emit and receive data. For example, the data can include control messages that are broadcast by the user devices 102-114. In example embodiments, the data can be used for the purpose of being "noticed" without requiring a two-way connection. Thus, in such embodiments, the entirety of the interaction between the user devices 102-114 can be performed without requiring a connection between the user devices. Instead, all relevant information for the interaction is contained within the data emitted by the user devices. Limiting user device interaction to the broadcasting and receiving of data can provide a nominal behavior that allows energy consumption and service life to be modeled and reasonably predicted. In alternative embodiments, user devices 102-114 can include mobile computing devices that use two-way communication. For instance, a user device using active scanning can implement two-way communication.

As an example, the user devices 102-114 can broadcast the data using short range wireless communication technologies such as, for example, Bluetooth, Bluetooth low energy, ZigBee, Near Field Communication, WiFi Direct, or other technologies. Furthermore, although short range wireless communication technologies are provided as an example, any communication method can be used to transmit data from the user devices 102-114, including, for example, wired connections, general radio frequency communication, optical communication, infrared communication, magnetic communication, or other communication methods.

As indicated, messages can be broadcast events that are capable of being received and processed by any listening device (e.g. user device). Various suitable communication protocols having various suitable frame formats or channel assignments can be used. In addition, as certain protocols are modified or replaced over time, the present disclosure can be easily adapted for implementation using such new protocols.

Control device 118 can be a mobile computing device as described above with regard to user devices 102-114. In embodiments wherein control device 118 is a user device, control device 118 can be configured only to broadcast data and not to receive data. In alternative embodiments, control device 118 can be a beacon device. For instance, as described above, a beacon device can be a small, low cost, self-contained device that can periodically provide (e.g. broadcast using a short range wireless communication technology) information. As will be described in more detail below, control device 118 can be configured to broadcast one or more control messages (e.g. beacon data). The control messages can be broadcast to user devices 102-114 via a mesh topology, wherein a user device that receives a control message from control device 118 can rebroadcast the control message such that another user device may receive the control message from the first user device.

Figure 2:
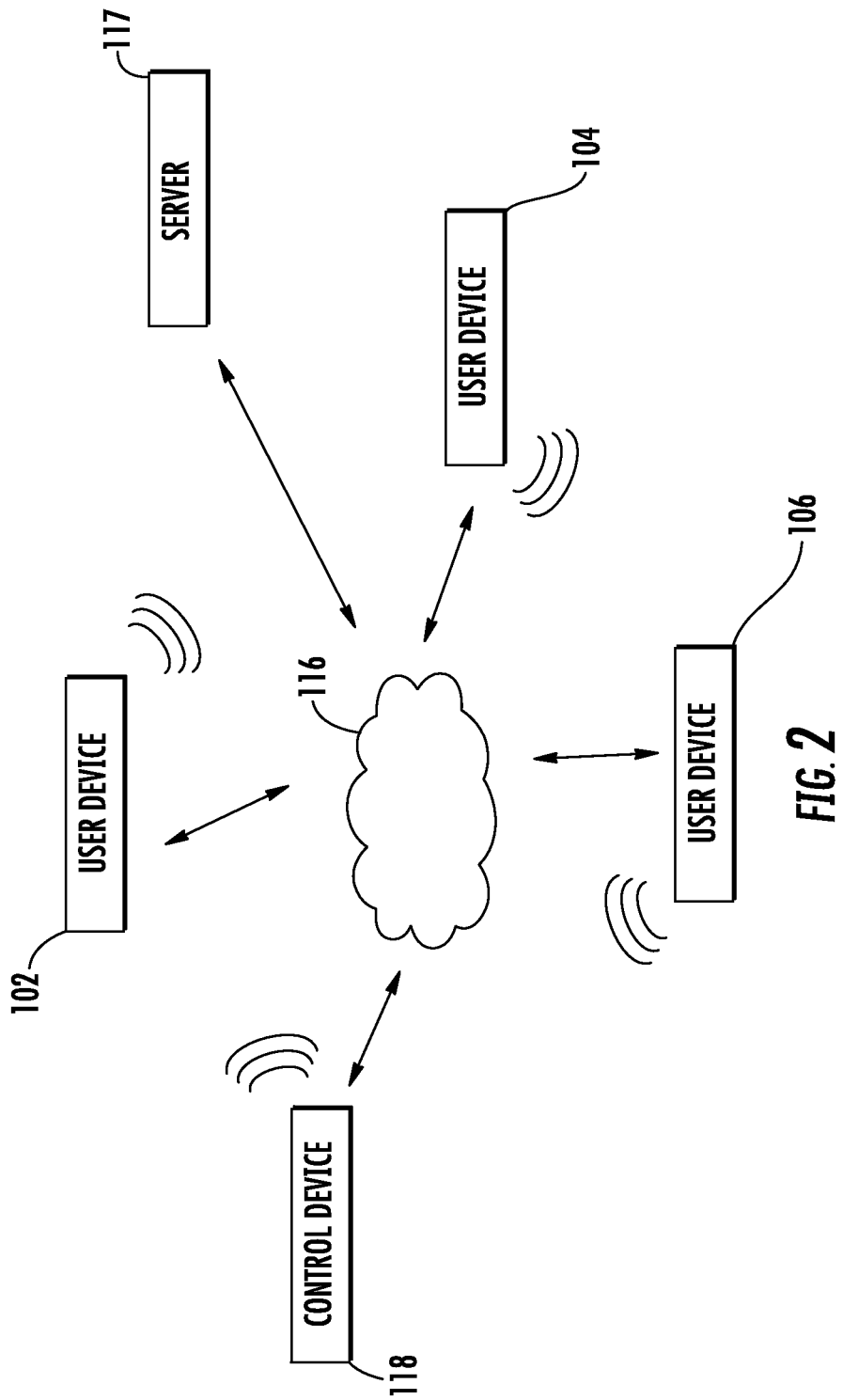
FIG. 2 depicts an example system for synchronizing displayed information on user devices according to example embodiments of the present disclosure.

In example embodiments, user devices 102-114 and/or control device 118 can be connected to a server. For instance, FIG. 2 depicts an example computing system 120 according to example embodiments of the present disclosure. FIG. 2 depicts control device 118, user devices 102-106, and a server 117. Server 117 can include one or more computing devices configured to communicate with user devices 102-106 and/or control device 118 over a network 116. As an example, server 117 can be one or more server computing devices. In the instance that a plurality of server computing devices are used, the server computing devices can be arranged according to any suitable computing architecture, including sequential computing architectures, parallel computing architectures, or combinations thereof.

Network 116 can be any type of communications network, such as a local area network (e.g., intranet), wide area network (e.g., Internet), or some combination thereof and can include any number of wired or wireless links. In general, communication between the server 118 and observing entities 112 and 114 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Furthermore, although user device 102 and control device 118 are shown as communicating directly with the server 117 over network 116, there may be any number of intervening devices between the user device 102 or control device 118 and the server 117. As an example, in some embodiments, groups of observing entities can be organized in a network (e.g. a mesh network) and can relay messages back and forth from a particular observing entity to the server 118.

Figure 3:
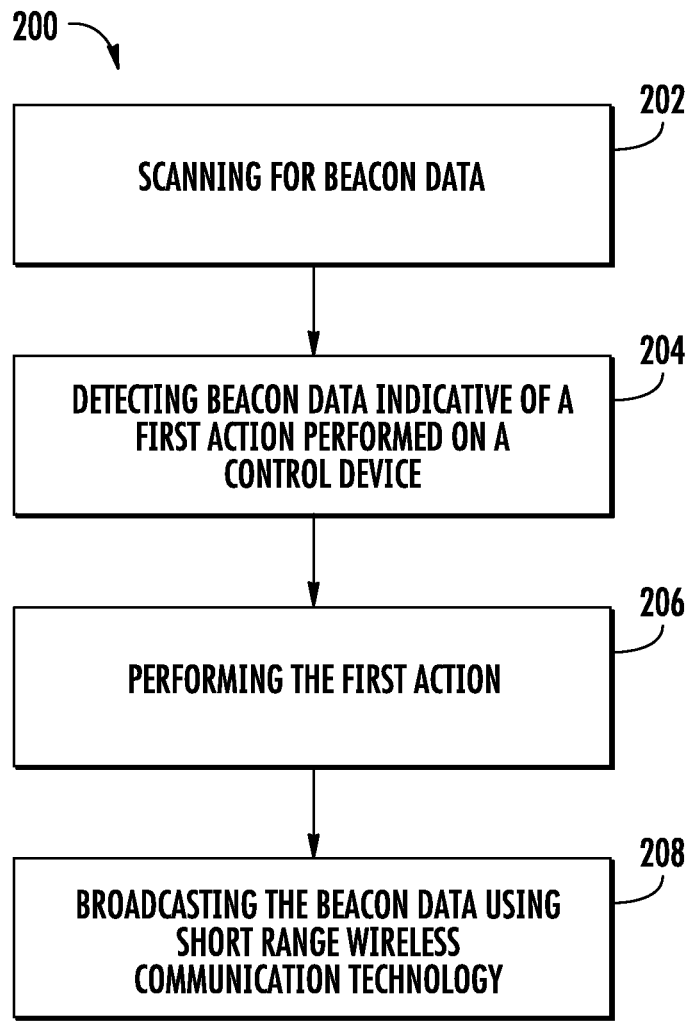
FIG. 3 depicts a flow diagram of an example method of synchronizing data in a beacon network according to example embodiments of the present disclosure.

FIG. 3 depicts a flow diagram of an example method (200) of synchronizing data among user devices. Method (200) can be implemented by one or more computing devices, such as one or more of the computing devices depicted in FIG. 7. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include scanning for beacon data. In particular, a user device can scan (e.g. using active or passive scanning), for beacon data being broadcast by one or more proximate devices (e.g. user devices or control devices). At (204), method 200 can include detecting beacon data from a proximate device. The beacon data can include an identifying signal indicative of the identity of the broadcasting device. The beacon data can further include one or more control messages indicative of a first action to be performed by the user device. In example embodiments, the first action can be an action initially performed by a control device. For instance, the action to be performed can include navigating (e.g. panning, zooming, scrolling etc.) within a user interface of the user device, displaying a notification, playing a media file (e.g. audio or video), opening an application, or various other suitable actions.

In example embodiments, the control message can include one or more characteristics of the action, such that the user device can perform the action based on the control message. For instance, if an action to be performed is a zooming action within an application displayed on the user device, the control message can include characteristics of the zooming action, such as for instance, the application in which the zooming action takes place, a position and/or location of the zooming action within the application, a depth of the zooming action, a speed at which the zooming action takes place, etc. As another example, if the action to be performed is a media playback action, the control message can include information indicative of the name and/or location of the media file.

At (206), method (200) can include performing, by the user device, the first action. For instance, in the above example wherein the action was a zooming action, the user device, upon receiving the control message, can perform the zooming action according to the characteristics provided in the control message. In the above example wherein the action was a media playback, the user device, upon receiving the control message, can locate the media file, and play the file in accordance with the characteristics provided in the control message. In example embodiments, the media file may be located in a memory of the user device, or the media file may be located in a remote computing device (e.g. server 117 of FIG. 2). In the former scenario, the user device may retrieve the media file from the memory, and play the file on the user device. In the latter scenario, the user device can, for instance, determine the location of the media file (e.g. within server 117) based at least in part on the contents of the control message, retrieve the media file from server 117 via a network (e.g. network 116), and play the media file on the user device.

At (208), method (200) can include rebroadcasting at least a portion of the beacon data (e.g. the control message) using short range wireless communication technology, such that another user device may detect the beacon data being broadcast. For instance, the user device may rebroadcast the beacon data using the same communication channel by which the beacon data was received, or using other suitable communication channels. The other user device may then perform the first action in accordance with the control message. In this manner, actions may be synchronized among user devices. In particular, each user device that detects beacon data that includes the control message can perform the first action responsive to receiving the beacon data, such that the users of the respective user devices may see and/or hear the same information.

As an example, a tour guide at a museum may interact with a user interface of a control device. In particular, the tour guide may zoom in on a particular image relating to a particular exhibit in the museum. The control device may then generate and broadcast beacon data containing a control message indicative of the zooming action performed on the control device. The beacon data may be detected by a first user device being carried by a first member of the tour group. The first user device can then perform the same zooming action on the same image based on the contents of the control message. The first user device can then begin broadcasting beacon data containing the same control message. A second user device being carried by a second member of the tour group may then detect the beacon data being broadcast by the first user device. The second user device may then perform the same action based on the received control message, and begin broadcasting the control message. In this manner, each user device that receives the control message (e.g. from either the control device or another user device) may perform the same action as the control device, such that they each display the same information as the control device.

Figure 4:
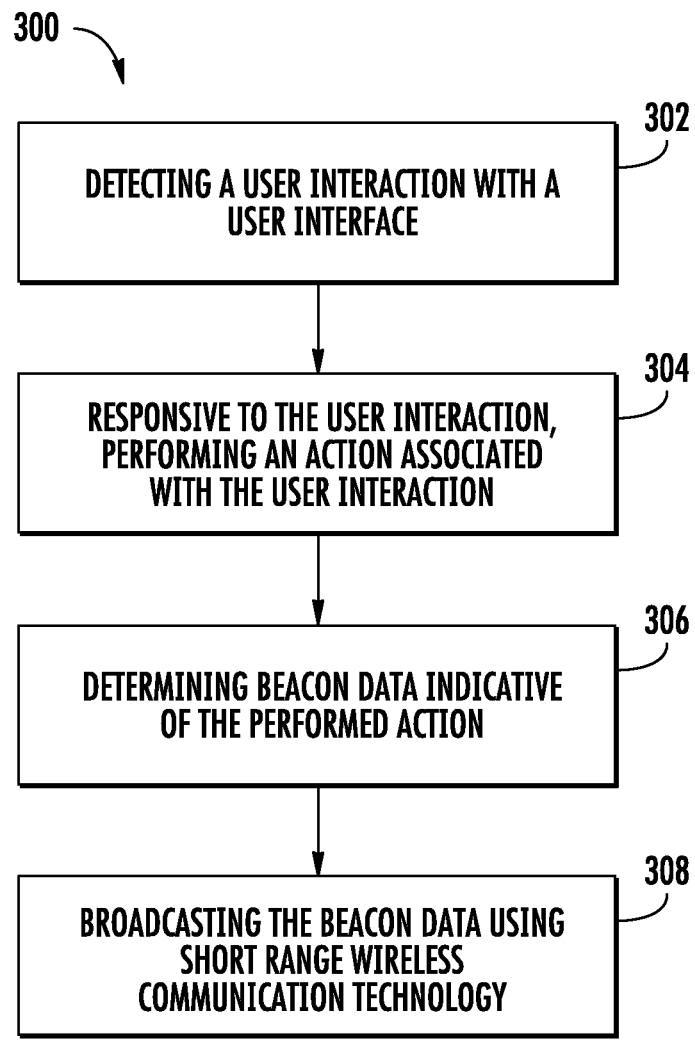
FIG. 4 depicts a flow diagram of an example method of synchronizing updated data in a beacon network according to example embodiments of the present disclosure.

As described above, the control message can originate from a control device. In example embodiments, the control device can be a user device, and the control message can be indicative of an action performed by the control device. For instance, FIG. 4 depicts a flow diagram of an example method (300) of generating and broadcasting a control message according to example embodiments of the present disclosure. At (302), method (300) can include detecting a user interaction with an interface of a user device. For instance, the user interaction may include a button press, a touch-based gesture (e.g. swipe, press, pinch, etc.), or various other suitable interactions.

At (304), method (300) can include, responsive to the user interaction, performing an action associated with the interaction. For instance, responsive to a pinch gesture on a touchscreen of the user device, the user device may perform a zooming action in accordance with the pinch gesture. At (306), method (300) can include determining beacon data indicative of the performed action. In particular, a control device may determine a control message indicative of one or more characteristics of the performed action. For instance, if the performed action includes scrolling vertically within a page of an application, the control message may include characteristics such as an identifier of the application and/or page, a starting position on the page, an ending position on the page, a speed with which to scroll, and/or various other suitable characteristics.

At (306), method (300) can include broadcasting the beacon data using short range wireless communication technology. For instance, the control device can broadcast beacon data that includes the control message and an identifier indicative of the identity of the control device.

In example embodiments, the control device can transfer a control property to a proximate user device, such that the user device becomes the control device. In this manner, the initial control device may also become a user device configured to scan for and receive beacon data. For instance, the new control device, after receiving the control property, may then broadcast beacon data indicative of an action performed by the new control device in accordance with example aspects of the present disclosure.

Figure 5:
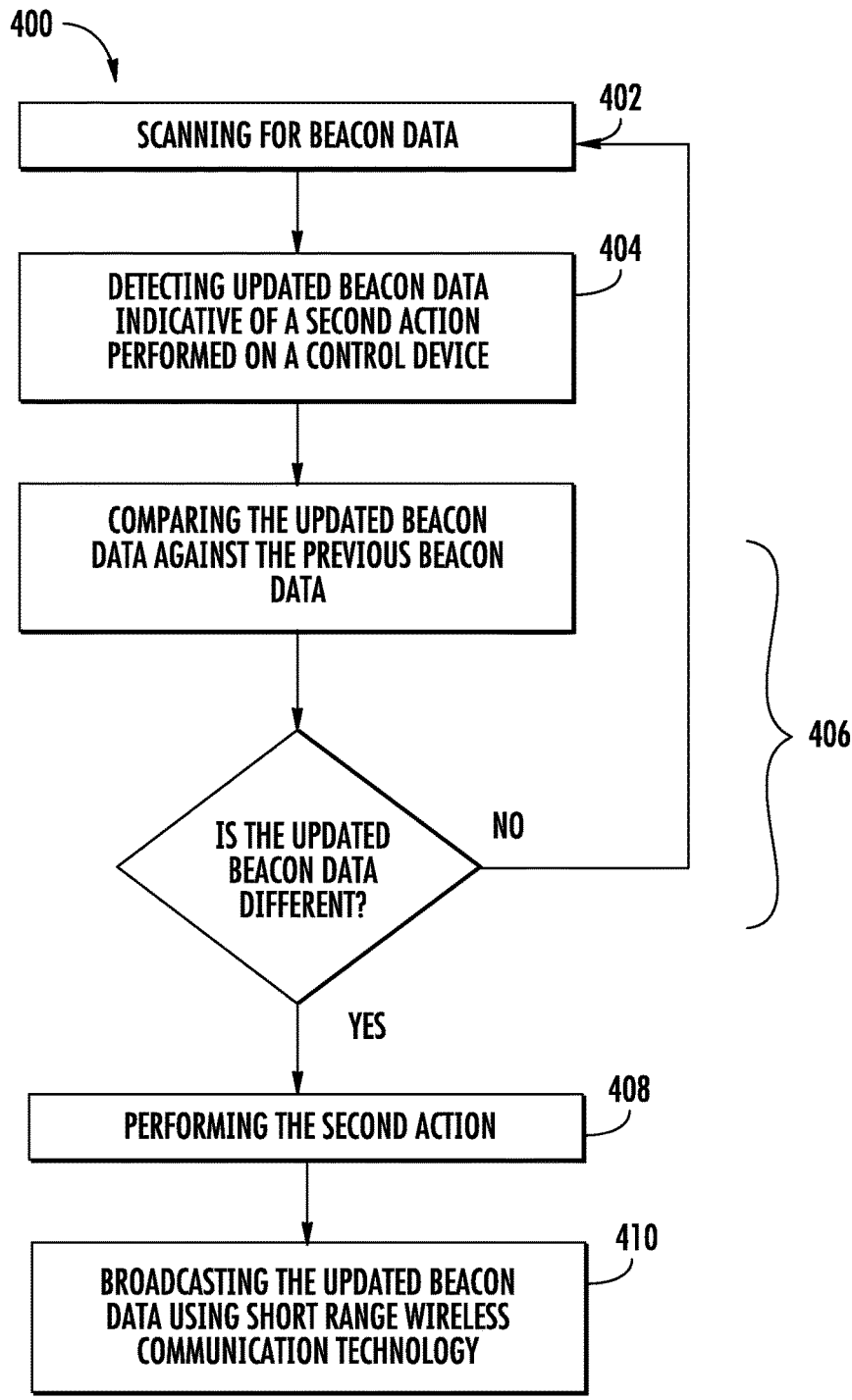
FIG. 5 depicts a flow diagram of an example method of subscribing to a user device in a beacon network according to example embodiments of the present disclosure.

In further example embodiments, a control device may broadcast multiple control messages over a period of time. For instance, subsequent to broadcasting the first control message, the control device may, responsive to a second action being performed on the control device, broadcast updated beacon data including an updated control message. One or more user devices may then detect the updated beacon data. FIG. 5 depicts a flow diagram of an example method (400) of detecting updated beacon data according to example embodiments of the present disclosure. At (402), method (400) can include scanning for beacon data. At (404), method (400) can include detecting updated beacon data. As described above, the updated beacon data can include an updated control message indicative of a second action performed on a control device. In example embodiments, the second action may be different than the first action.

At (406), method (400) can include comparing the updated beacon data to beacon data previously received by the user device. In particular, the user device can compare the updated control message to the previously received control message to determine if a new action is to be performed. If the control message is indicative of the action most recently performed by the user device, the beacon data can be discarded and the user device can continue scanning for beacon data (e.g. method (400) can return to (402)).

If the updated beacon data includes a control message indicative of a new action to be performed, then method (400) can include performing the second (e.g. new) action (408). For instance, if the first action performed by the user device was scrolling from point A to point B of a web page, application, etc., the updated beacon data may include a control message instructing the user device to scroll from point B to point C.

At (410), method (400) can include broadcasting (e.g. using short range wireless communication technology) the updated beacon data. In particular, the user device can cease broadcasting the previously received control message and can begin broadcasting the updated control message. In this manner, one or more other user devices may detect the updated beacon data (e.g. the updated control message) and perform the second action.

Figure 6:
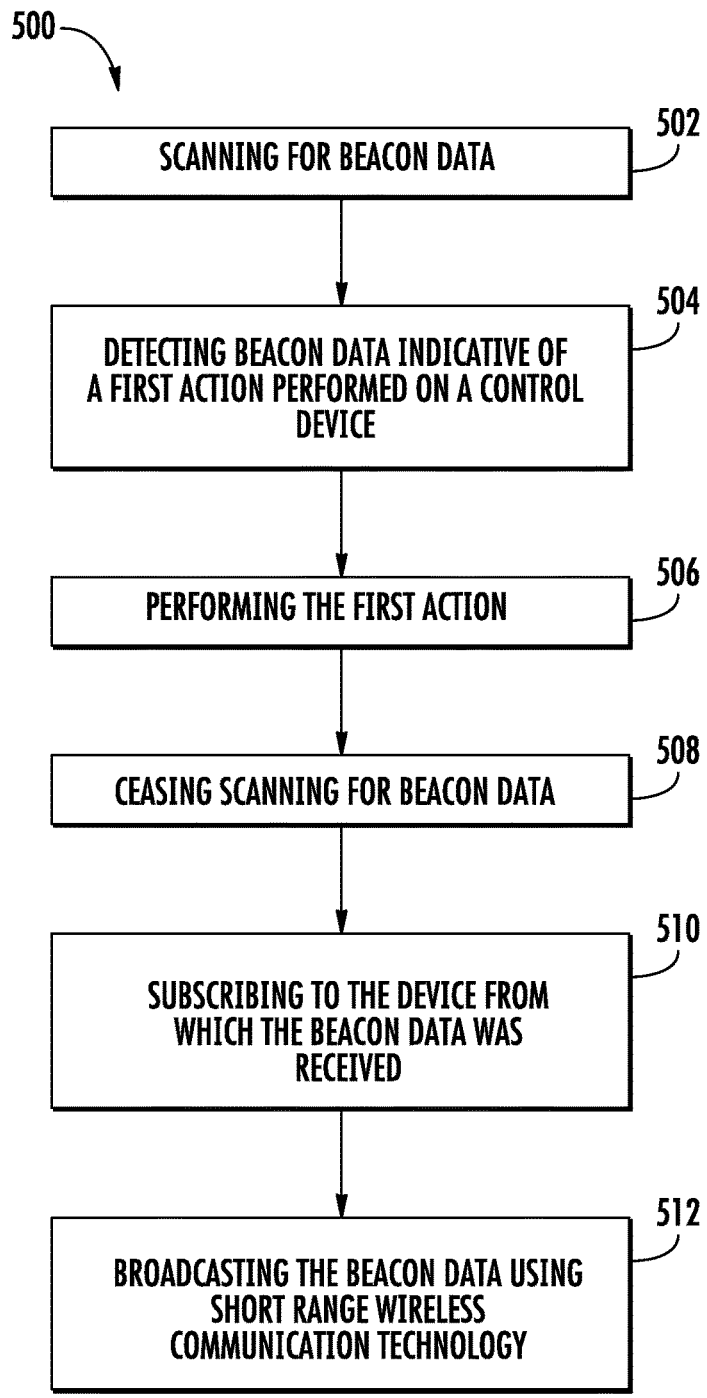
FIG. 6 depicts a flow diagram of an example method of generating beacon data according to example embodiments of the present disclosure.

As described above, in example embodiments, a user device may subscribe to a device (e.g. a control device or a user device) from which the user device receives beacon data. For instance, FIG. 6 depicts a flow diagram of an example method (500) of subscribing to a device. At (502), method (500) can include scanning for beacon data. At (504), method (500) can include detecting beacon data that was broadcast by a device. The device may be a control device or a different user device. The beacon data may include a control message indicative of an action that was initially performed on the control device. As described above, the action may include one or more of scrolling, panning, zooming, playing media, displaying a notification, opening an application, opening a web page, displaying an image, moving within a game, and/or various other suitable actions.

At (506), method (500) can include performing the first action in accordance with the received control message. At (508), method (500) can include, responsive to detecting the beacon data, ceasing scanning for beacon data. At (510), method (500) can include subscribing to the device from which the beacon data was received. To initiate a subscription, the user device can provide to the device a subscription indication. The subscription indication may include an identifier associated with the user device. Once a subscription is created, the subscribed-to device can, upon receiving a new (e.g. updated) control message, provide the control message directly to the user device. In this manner, the user device can receive beacon data from the subscribed-to device without having to scan for the beacon data. The subscribed-to device may then also broadcast the beacon data such that one or more other proximate user devices may detect the beacon data broadcasted by the subscribed-to device.

In alternative embodiments, subscribing to a device may include providing to the device a request to subscribe. The request to subscribe can include an identifier associated with the user device. Upon receiving the request, the device may determine whether to permit the user device to subscribe. In determining whether to permit the user device to subscribe, the device may consider, for instance, factors such as the distance between the devices, the amount of other user devices already subscribed to the device, the frequency at which new control messages are received, and/or various other suitable factors.

The duration of a subscription may be dependent on a number of factors. For instance, a subscription may automatically end if the length of time between receiving updated control messages reaches a threshold length (e.g. 5 minutes, 10 minutes, or any other suitable length). As another example, the subscription may be ended manually by either the user device or the subscribed-to device. As yet another example, the subscription may end if the devices travel out of range of each other. It will be appreciated that various other events and/or occurrences may cause a subscription to end without deviating from the scope of the present disclosure.

At (512), method (500) can include broadcasting the beacon data. In particular, once the user device receives the beacon data from the subscribed-to device, the user device can broadcast the beacon data using short range wireless communication technology. In this manner, although the user device does not scan for beacon data, it may still broadcast received beacon data such that the beacon data may be detected by one or more proximate user devices.

Figure 7:
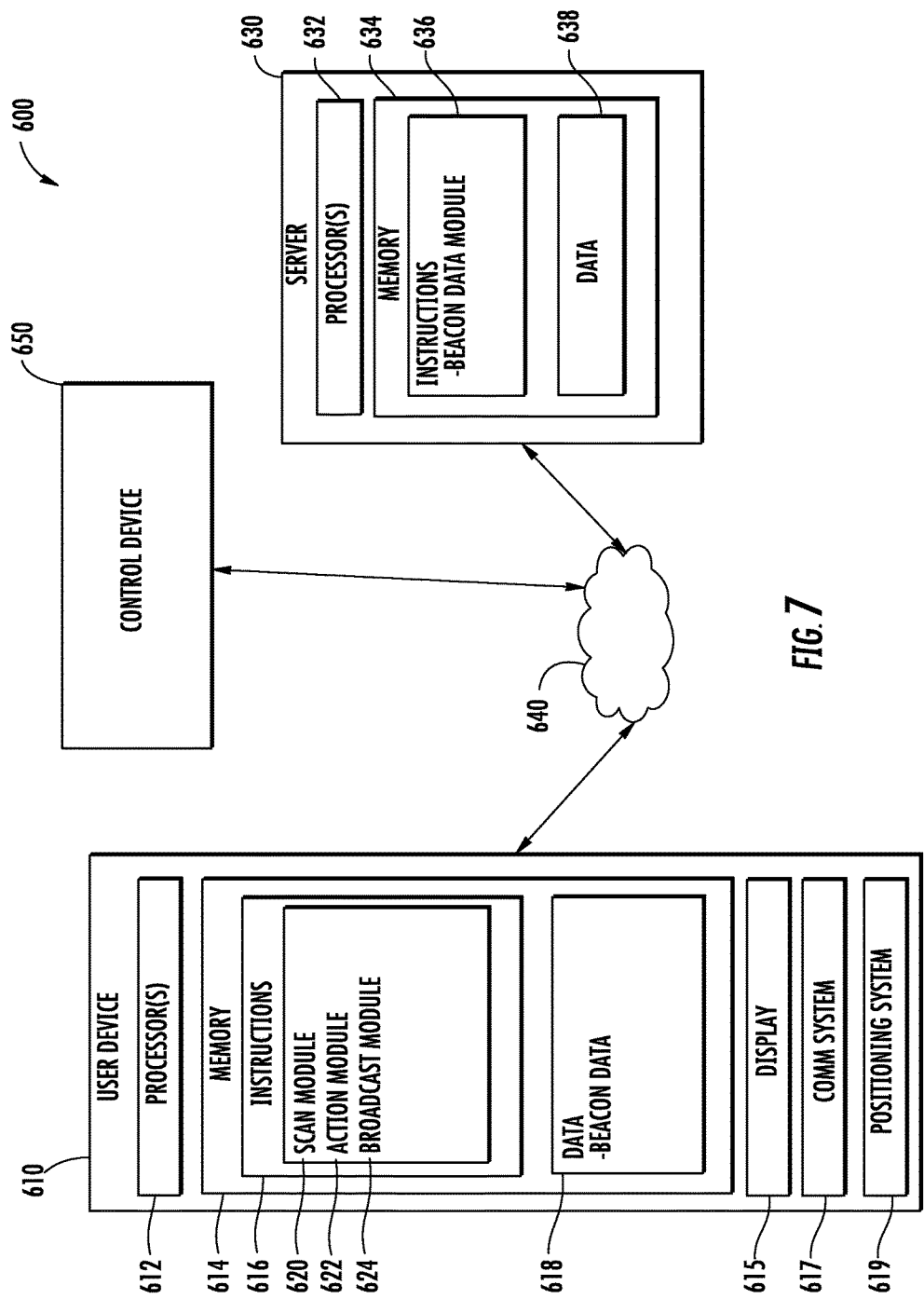
FIG. 7 depicts an example computing system according to example embodiments of the present disclosure.

FIG. 7 depicts an example computing system 600 that can be used to implement the methods and systems of synchronizing data among user devices according to example aspects of the present disclosure. System 600 can include one or more user devices 610. User device(s) 610 can be any suitable type of mobile computing device, such as a smartphone, tablet, cellular telephone, wearable computing device, or any other suitable mobile computing device capable of being carried by a user while in operation. User device(s) 610 can include one or more processor(s) 612 and one or more memory devices 614.

The one or more processor(s) 612 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 614 can include one or more computer-readable media, including, but not limited to, non-transitory computer-readable media, RAM, ROM, hard drives, flash memory, or other memory devices.

The one or more memory devices 614 can store information accessible by the one or more processors 612, including instructions 616 that can be executed by the one or more processors 612. For instance, the memory devices 614 can store instructions 616 for implementing one or more modules configured to implement a scan module 620, an action module 622, a broadcast module 624, and/or various aspects of any of the methods disclosed herein. Scan module 620 can be configured to scan for and detect beacon data. Action module 622 can be configured to perform an action in accordance with the detected beacon data. Broadcast module 624 can be configured to broadcast the beacon data using short range wireless communication technologies.

The one or more memory devices 614 can also include data 618 that can be retrieved, manipulated, created, or stored by the one or more processors 612. The data can include, for instance, beacon data and/or other information.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, ROM, flash memory, hard disk or optical or magnetic media. In example embodiments, modules can be implemented in hardware independent of the one or more processors. For instance, a module can be implemented using a WiFi and/or Bluetooth transceiver, module or microcontroller. When software is used, any suitable programming language or platform can be used to implement the module.

User device(s) 610 can include various input/output devices for providing and receiving information from a user, such as a touch screen, touch pad, data entry keys, speakers, and/or a microphone suitable for voice recognition. For instance, user device(s) 610 can have a display 615 for presenting a user interface to a user. User device(s) 610 can further include a communication system 617. Communication system 617 can be used to communicate with a user device or a control device, such as control device 650.

User device(s) 610 can further include a positioning system 619. The positioning system 619 can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, WiFi time-of-flight, and/or other suitable techniques for determining position.

User device(s) 610 can also include a network interface used to communicate with one or more remote computing devices (e.g. server 630) over a network 640. The network interface can include any suitable components for interfacing with one more networks, including for example, transmitters, receivers, ports, controllers, antennas, or other suitable components.

Similar to the user device(s) 610, server 630 can include one or more processor(s) 632 and a memory 634. The one or more processor(s) 632 can include one or more central processing units (CPUs), and/or other processing devices. The memory 634 can include one or more computer-readable media and can store information accessible by the one or more processors 632, including instructions 636 that can be executed by the one or more processors 632, and data 638. For instance, the memory 634 can store instructions 636 for implementing a beacon data module.

Server 630 can also include a network interface used to communicate with user device(s) 610 over network 640. The network interface can include any suitable components for interfacing with one more networks, including for example, transmitters, receivers, ports, controllers, antennas, or other suitable components.

Network 640 can be any type of communications network, such as a local area network (e.g. intranet), wide area network (e.g. Internet), cellular network, or some combination thereof. Network 640 can also include a direct connection between user device(s) 610 and server 630. Network 640 can include any number of wired or wireless links and can be carried out using any suitable communication protocol.

System 600 can further include one or more control devices, such as control device 650. Control device 650 can be a user device, such as user device 610, or a beacon device. Control device 650 can broadcast one or more control messages indicative of one or more actions to be performed by user device(s) 610. Control device 650 can be implemented using any suitable computing device(s). Although only one control device is depicted in FIG. 7, it will be appreciated by those skilled in the art that any suitable number of beacon devices can be included in system 600.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of synchronizing data in a beacon network, the method comprising:
    scanning, by one or more computing devices, for beacon data, the beacon data being broadcast by one or more mobile computing devices using short range wireless communication technology;
    detecting, by the one or more computing devices, beacon data from at least one of the mobile computing devices, the beacon data indicative of a first action performed by a control device;
    performing, by the one or more computing devices, the first action, wherein the first action is performed within an application associated with the control device; and
    responsive to detecting the beacon data, broadcasting, by the one or more computing devices, the beacon data using short range wireless communication technology.

2. The computer-implemented method of claim 1, further comprising:
    detecting, by the one or more computing devices, updated beacon data from at least one of the plurality of mobile computing devices;
    determining, by the one or more computing devices, if the updated beacon data is different than the previously detected beacon data;
    when the updated beacon data is different than the previously detected beacon data, performing, by the one or more computing devices, a second action associated with the updated beacon data; and
    broadcasting, by the one or more computing devices, the updated beacon data using short range wireless communication technology.

3. The computer-implemented method of claim 1, wherein the first action comprises at least one of scrolling, zooming, or panning within a user interface displayed by the control device.

4. The computer-implemented method of claim 1, wherein the first action comprises playing a media file on the control device.

5. The computer-implemented method of claim 3, wherein the beacon data further comprises characteristics of the first action such that the first action may be performed by the one or more computing devices.

6. The computer-implemented method of claim 2, wherein the updated beacon data is indicative of the second action, and wherein the second action was originally performed by the control device.

7. The computer-implemented method of claim 1, wherein the beacon data originates from the control device.

8. The computer-implemented method of claim 1, wherein the action performed by the control device is performed responsive to a user input.

9. The computer-implemented method of claim 1, further comprising:
    responsive to detecting beacon data from the at least one mobile computing device, decreasing, by the one or more computing devices, a scan rate of scanning for beacon data;
    subscribing, by the one or more computing devices, to the at least one mobile computing device; and
    receiving, by the one or more computing devices, updated beacon data from the at least one mobile computing device.

10. The computer-implemented method of claim 9, further comprising broadcasting, by the one or more computing devices, the received updated beacon data using short range wireless communication technology.

11. The computer-implemented method of claim 1, wherein the control device is a mobile computing device configured to broadcast beacon data.

12. A computing system, comprising:
one or more processors; and
one or more memory devices, the one or more memory devices storing computer-readable instructions that when executed by the one or more processors cause the one or more processors to perform operations, the operations comprising:
scanning for beacon data, the beacon data being broadcast by one or more mobile computing devices using short range wireless communication technology;
detecting first beacon data from at least one of the mobile computing devices, the first beacon data comprising a control message indicative of a first action performed by a control device, wherein the first action is performed within an application associated with the control device;
performing the first action based at least in part on the control message; and
responsive to detecting the first beacon data, broadcasting at least a portion of the first beacon data using short range wireless communication technology.

13. The computing system of claim 12, the operations further comprising:
detecting updated beacon data from at least one of the plurality of mobile computing devices;
comparing the updated beacon data with the first beacon data;
when the updated beacon data is different than the first beacon data, performing a second action based at least in part on the updated beacon data;
ceasing broadcasting the at least a portion of the first beacon data; and
broadcasting the updated beacon data using short range wireless communication technology.

14. The computing system of claim 13, wherein the updated beacon data contains an updated control message indicative of the second action, and wherein the second action was originally performed by the control device.

15. The computer-implemented method of claim 12, wherein the first action comprises at least one of scrolling, zooming, panning, playing a media file, providing a notification for display, opening an application, or opening a web page.

16. The computing system of claim 12, the operations further comprising:
responsive to detecting beacon data from the at least one mobile computing device, ceasing scanning for beacon data;
subscribing to the at least one mobile computing device; and
receiving updated beacon data directly from the at least one mobile computing device.

17. One or more tangible, non-transitory computer-readable media storing computer-readable instructions that when executed by one or more processors cause the one or more processors to perform operations, the operations comprising:
scanning for beacon data, the beacon data being broadcast by one or more mobile computing devices using short range wireless communication technology;
detecting first beacon data from at least one of the mobile computing devices, the first beacon data comprising a control message indicative of a first action performed by a control device, wherein the first action is performed within an application associated with the control device;
performing the first action based at least in part on the control message; and
responsive to detecting the first beacon data, broadcasting at least a portion of the first beacon data using short range wireless communication technology.

18. The one or more tangible, non-transitory computer-readable media of claim 17, the operations further comprising:
detecting updated beacon data from at least one of the plurality of mobile computing devices;
comparing the updated beacon data with the first beacon data;
when the updated beacon data is different than the first beacon data, performing a second action based at least in part on the updated beacon data;
ceasing broadcasting the at least a portion of the first beacon data; and
broadcasting the updated beacon data using short range wireless communication technology.

19. The one or more tangible, non-transitory computer-readable media of claim 17, the operations further comprising:
responsive to detecting beacon data from the at least one mobile computing device, ceasing scanning for beacon data;
subscribing to the at least one mobile computing device; and
receiving updated beacon data directly from the at least one mobile computing device.

\* \* \* \* \*